(12) United States Patent
Koyama et al.

(10) Patent No.: US 11,065,641 B2
(45) Date of Patent: Jul. 20, 2021

(54) COIL SPRING MANUFACTURING METHOD AND COIL SPRING MANUFACTURING DEVICE

(71) Applicant: NHK SPRING CO., LTD., Yokohama (JP)

(72) Inventors: Yoshimitsu Koyama, Kitakami (JP); Mitsuhiro Sugiyama, Yokohama (JP); Tatsuya Watanuki, Yokohama (JP)

(73) Assignee: NHK SPRING CO., LTD., Kanagawa (JP)

( * ) Notice: Subject to any disclaimer, the term of this patent is extended or adjusted under 35 U.S.C. 154(b) by 114 days.

(21) Appl. No.: 16/100,053

(22) Filed: Aug. 9, 2018

(65) Prior Publication Data

US 2018/0361424 A1 Dec. 20, 2018

Related U.S. Application Data

(63) Continuation of application No. PCT/JP2017/004818, filed on Feb. 9, 2017.

(30) Foreign Application Priority Data

Feb. 10, 2016 (JP) .............................. JP2016-023474

(51) Int. Cl.
*B05D 1/24* (2006.01)
*B05C 19/02* (2006.01)
(Continued)

(52) U.S. Cl.
CPC .................. *B05D 1/24* (2013.01); *B05C 3/02* (2013.01); *B05C 19/02* (2013.01); *B05D 3/00* (2013.01);
(Continued)

(58) Field of Classification Search
CPC .. B05C 19/02; B05C 3/02; B05C 3/10; B05D 1/24; B05D 3/00; B05D 7/00;
(Continued)

(56) References Cited

U.S. PATENT DOCUMENTS 3,321,438 A * 5/1967 Brooker ................. C08G 59/50
528/118
3,464,384 A 9/1969 Miller et al.
(Continued)

FOREIGN PATENT DOCUMENTS

CN 1543378 A 11/2004
DE 102007003819 A1 11/2007
(Continued)

OTHER PUBLICATIONS

Extended European Search Report (EESR) dated Nov. 4, 2019 issued in European Application No. 17750342.2.
(Continued)

*Primary Examiner* — Alexander M Weddle
(74) *Attorney, Agent, or Firm* — Holtz, Holtz & Volek PC

(57) ABSTRACT

Provided is a coil spring manufacturing method. In the coil spring manufacturing method, a coil spring of a vehicle suspension member is immersed in a fluidized bed in which powder coat is fluidized for coating. The fluidized bed includes a vertical stream area in which the powder coat moves upward and downward. The coil spring is immersed in the vertical stream area of the fluidized bed while an end coil of the coil spring faces upward, and is periodically subjected to a relative movement with respect to a direction containing components vertical to a central axis of the coil spring in relation to the vertical stream area.

4 Claims, 9 Drawing Sheets

(51) Int. Cl.
*F16F 1/06* (2006.01)
*B05D 3/00* (2006.01)
*B05C 3/02* (2006.01)
*B05D 7/00* (2006.01)
*B60G 11/14* (2006.01)

(52) U.S. Cl.
CPC .................. *B05D 7/00* (2013.01); *F16F 1/06* (2013.01); *B60G 11/14* (2013.01); *B60G 2206/724* (2013.01); *B60G 2206/80* (2013.01); *F16F 2224/0208* (2013.01); *F16F 2226/02* (2013.01)

(58) Field of Classification Search
CPC .............. B60G 11/14; B60G 2206/724; B60G 2206/80; F16F 1/06; F16F 2224/0208; F16F 2226/02
See application file for complete search history.

(56) References Cited

U.S. PATENT DOCUMENTS

| | | | | |
|---|---|---|---|---|
| 3,985,097 | A | * | 10/1976 | Sitton ..................... B05C 19/02 118/425 |
| 4,542,043 | A | * | 9/1985 | Abe ......................... B01J 2/006 118/303 |
| 4,753,423 | A | | 6/1988 | Ukai et al. |
| 6,140,430 | A | * | 10/2000 | Ruth .................... C08G 59/226 427/386 |
| 6,537,610 | B1 | | 3/2003 | Springer et al. |
| 7,041,340 | B2 | | 5/2006 | Kittle et al. |
| 2002/0110689 | A1 | * | 8/2002 | Hu ........................... B01J 20/20 428/375 |
| 2007/0000131 | A1 | * | 1/2007 | Klootwijk ................ B05D 1/24 29/896.21 |
| 2007/0172665 | A1 | | 7/2007 | Kunita et al. |
| 2009/0123665 | A1 | * | 5/2009 | Zaima ...................... B01J 4/002 427/595 |
| 2009/0130319 | A1 | | 5/2009 | Hayakawa |
| 2010/0255296 | A1 | | 10/2010 | Kunita et al. |
| 2011/0274841 | A1 | | 11/2011 | Hayakawa |

FOREIGN PATENT DOCUMENTS

| | | | |
|---|---|---|---|
| JP | 6012111 | B2 | 3/1985 |
| JP | 61111174 | A * | 5/1986 |
| JP | 61111174 | A | 5/1986 |
| JP | 61278635 | A | 12/1986 |
| JP | S62294463 | A | 12/1987 |
| JP | 2007198490 | A | 8/2007 |
| JP | 2007313475 | A | 12/2007 |
| JP | 2009125629 | A | 6/2009 |
| JP | 2011110464 | A | 6/2011 |
| JP | 2011139993 | A | 7/2011 |
| JP | 2012143664 | A | 8/2012 |
| JP | 2013048997 | A | 3/2013 |
| WO | 2007138396 | A1 | 12/2007 |

OTHER PUBLICATIONS

International Search Report (ISR) dated May 9, 2017 issued in International Application No. PCT/JP2017/004818.
Written Opinion dated May 9, 2017 issued in International Application No. PCT/JP2017/004818.
Chinese Office Action (and English language translation thereof) dated Sep. 25, 2020 issued in Chinese Application No. 201780009617.1.

* cited by examiner

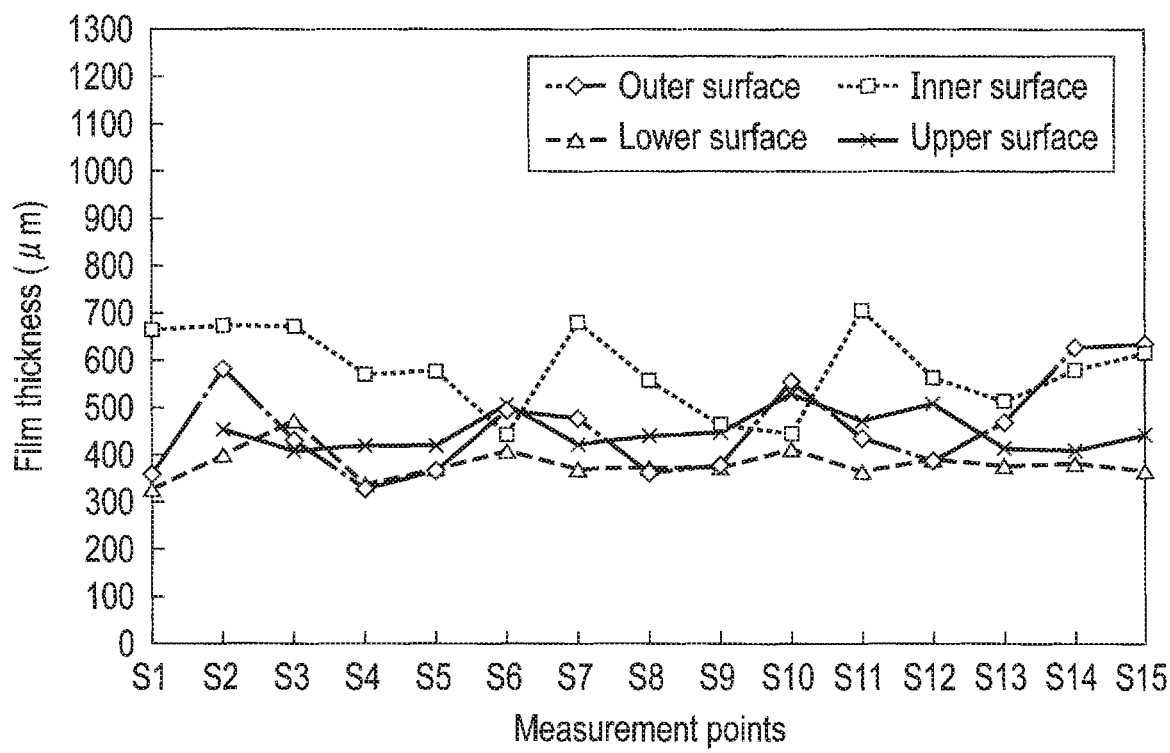
F I G. 9
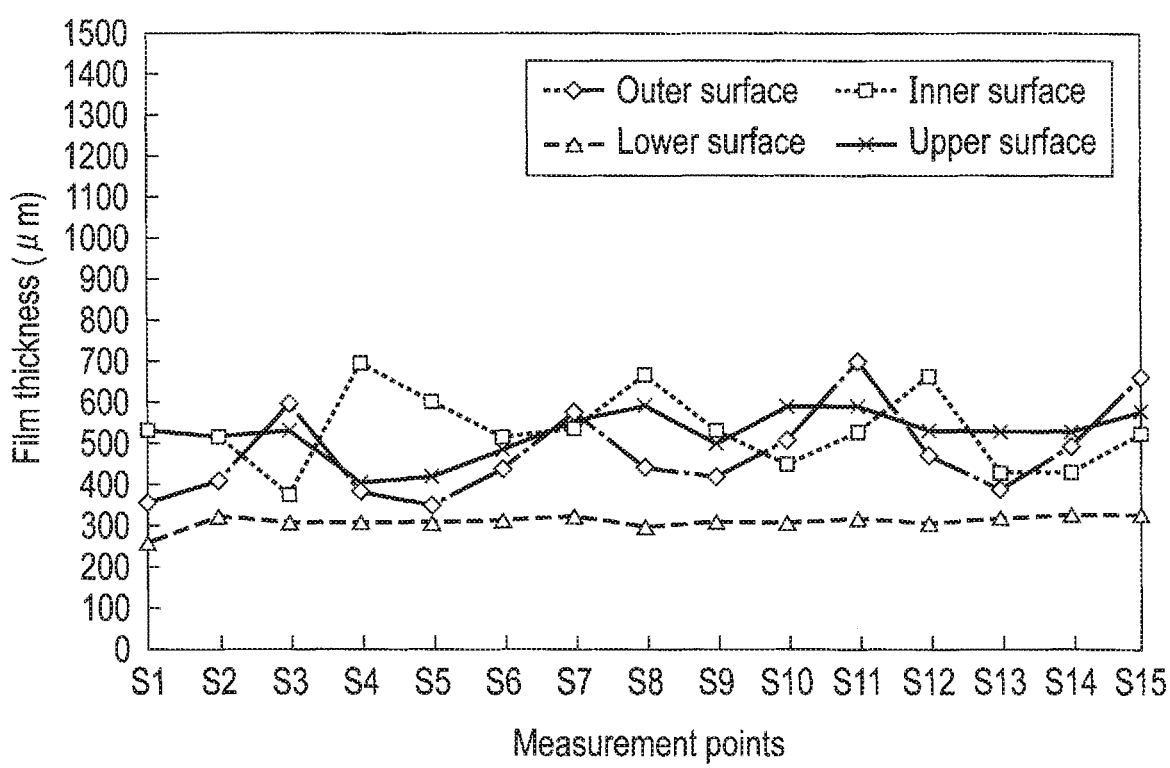
F I G. 10

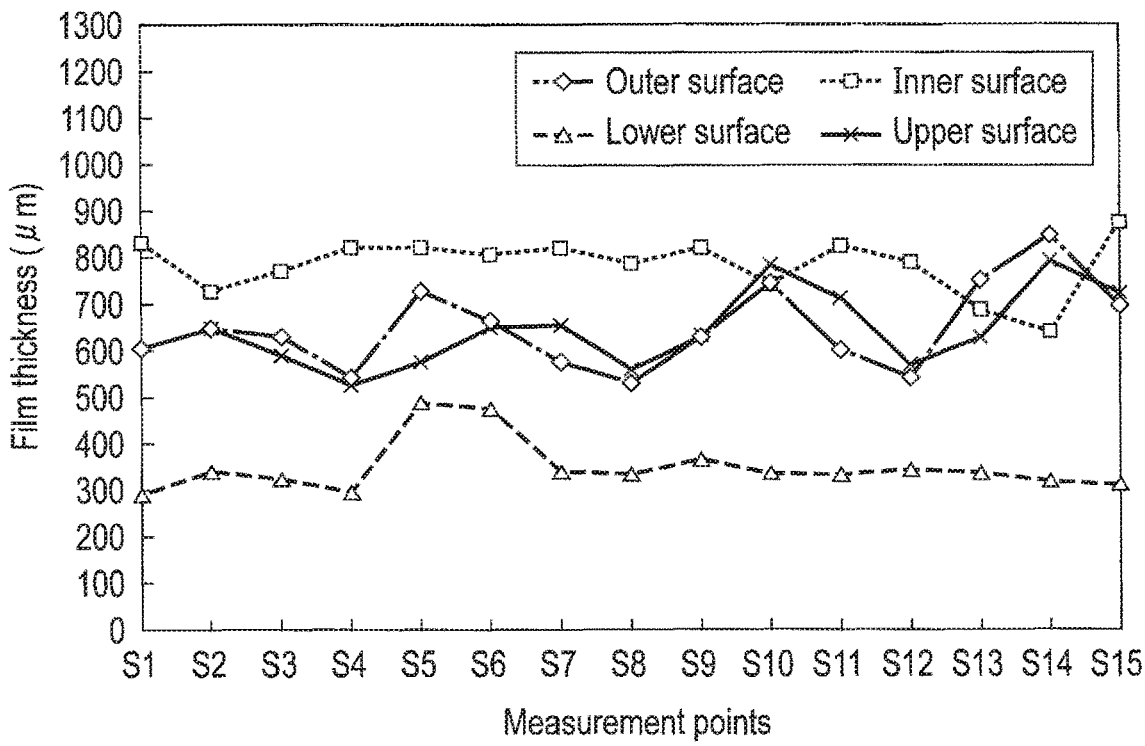
F I G. 11
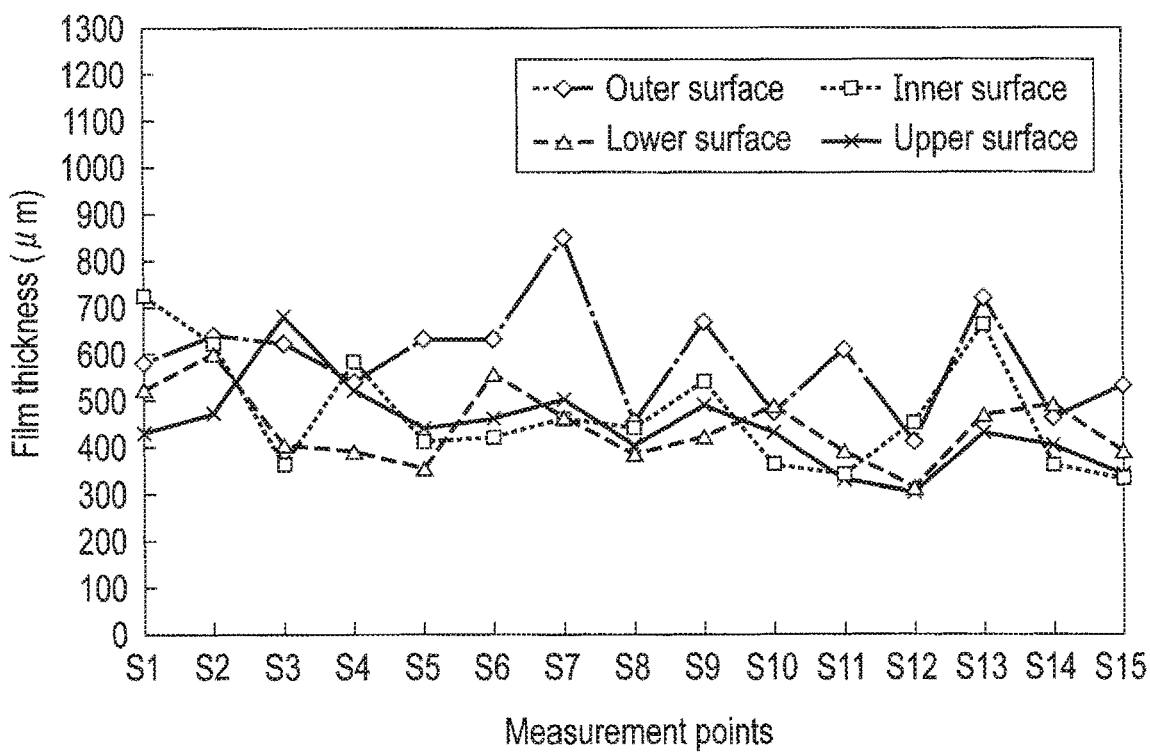
F I G. 12

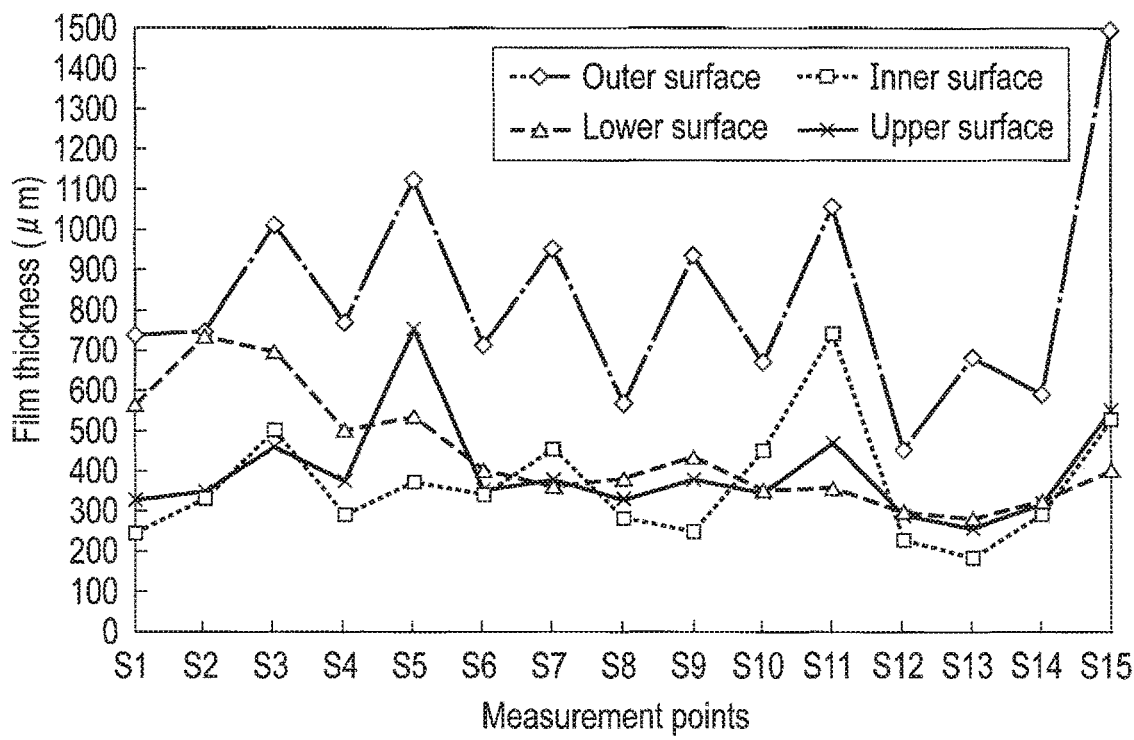
F I G. 13
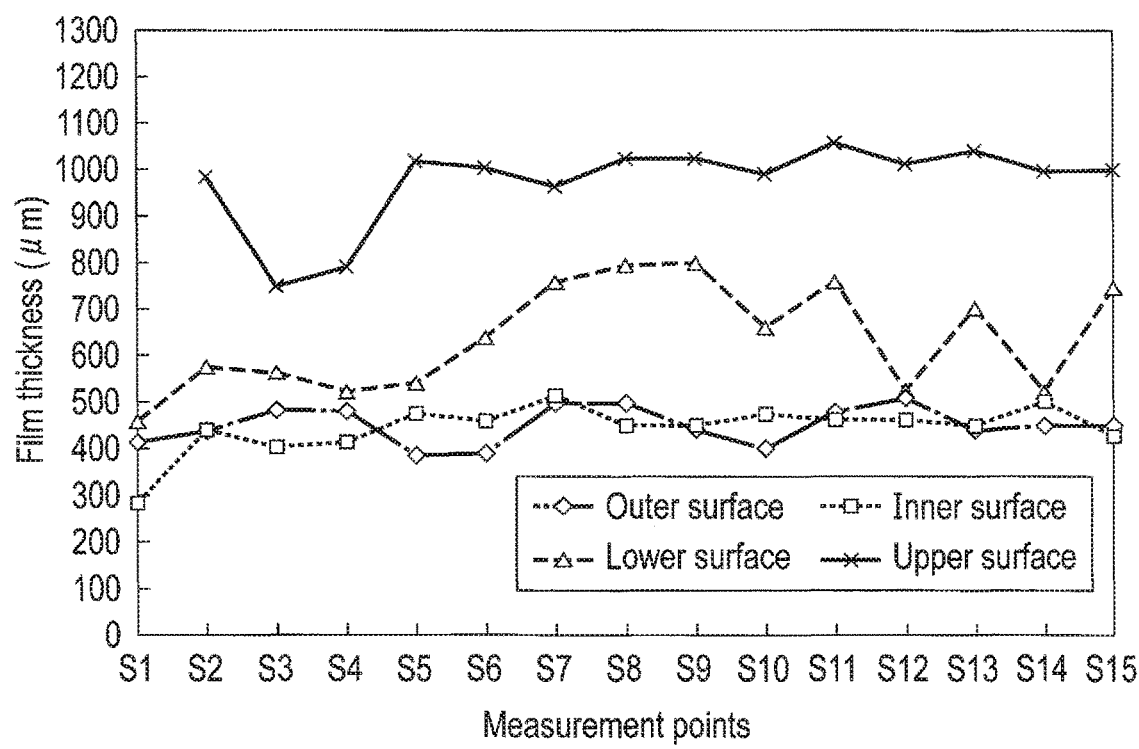
F I G. 14

COIL SPRING MANUFACTURING METHOD AND COIL SPRING MANUFACTURING DEVICE

CROSS-REFERENCE TO RELATED APPLICATIONS

This application is a Continuation Application of PCT Application No. PCT/JP2017/004818, filed Feb. 9, 2017 and based upon and claiming the benefit of priority from prior Japanese Patent Application No. 2016-023474, filed Feb. 10, 2016, the entire contents of all of which are incorporated herein by reference.

BACKGROUND OF THE INVENTION

1. Field of the Invention

Embodiments described herein relate generally to a coil spring manufacturing method and a coil spring manufacturing device used in the coil spring manufacturing method.

2. Description of the Related Art

Vehicles such as an automobile include a suspension mechanism with various suspension members including a coil spring, which is interposed between a vehicle body and a wheel. The coil spring of the suspension member is formed of a spring steel, and an antirust coating film is applied to the surface of the coil spring.

The antirust coating film covering the coil spring is required to have functions such as preventing chipping caused by stones flying thereon during drive and preventing corrosion caused by rain and the like. In order to securely achieve such functions, the lower limit of film thickness of the antirust coating film is strictly controlled.

While the coil spring is in an assembled state, an end coil in a wheel side is supported by a spring seat of a suspension mechanism. Since mud and water come between the end coil in the wheel side and the spring seat, the antirust coating film of the end coil in the wheel side requires especially strict film thickness control.

When a coil spring is hung on a hanger for a coating process, the contact point of the hanger and the coil spring cannot be coated. Thus, in a coating process, only a single end which is an end coil in the vehicle body side is hung by the hanger while the end coil in the wheel side to which strict film thickness control is required is left free. As a method of forming an antirust coating film on the surface of the coil spring, powder coating using electrostatic coating in which charged powder coat is applied to the coil spring with an electrostatic gun is known (as in Patent Literature 1 (JP 2012-143664 A), for example).

BRIEF SUMMARY OF THE INVENTION

Since the coil spring is formed in a spiral, if the electrostatic coating method is applied while one end of the end coil in the vehicle body side is supported, an adhesion amount of powder coat at the outer spiral part which is opposed to the electrostatic gun significantly differs from that of the other part of the spiral. Thus, forming a coating film evenly spread on the coil spring has been difficult in the powder coating of the electrostatic coating method. Since the lower limit of film thickness required for the antirust coating film is strictly determined, when the unevenness of film becomes significant, the cost for the part where the coating is applied thicker than the lower limit thickness will be wasted.

As another method of powder coating, there is a fluidization bed coating method where a base material is immersed in a fluidized bed in which a powder coating material is fluidized. However, in the fluidized bed coating method, the adhesion amount of powder coat in the upper surface of the coil spring significantly differs from that of the lower surface of the coil spring because of the streaming power coat in the fluidized bed. In addition, when air ejecting from holes of a hole plate gathers to form bubbles, the lower surface of the coil spring may have orange peel thereon by the bubbles.

The present invention provides a technique to reduce the unevenness of film thickness of an antirust coating film and provides a coil spring manufacturing method which can secure the lower limit of coating film and can reduce the amount of powder coat used and a coil spring manufacturing device of the same merit.

A coil spring manufacturing method of the present application includes coating a coil spring as a vehicle suspension member by immersing the coil spring into a fluidized bed in which a powder coat is flown. The fluidized bed includes an vertical stream area in which the powder coat material flows upstream or downstream. The coil spring is immersed in the vertical stream area while an end coil of the coil spring faces upward, and the coil spring is periodically subjected to a relative movement with respect to a direction containing components vertical to a central axis of the coil spring.

Furthermore, a coil spring manufacturing device of the present application coats a coil spring of a vehicle suspension member. The coil spring manufacturing device includes a coating bath, circulator, relative movement mechanism, and conveyor. The coating bath is filled with a powder coat. The circulator flows the powder coat to form a fluidized bed. The conveyor conveys a coil spring to the coating bath. The fluidized bed includes a vertical stream area in which the powder coat material flows upstream or downstream. The conveyor immerses the coil spring in the vertical stream area while an end coil of the coil spring faces upward. The relative movement mechanism periodically moves the coating bath in a horizontal direction with respect to the coil spring.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 shows a result of measurement of Example 1.

FIG. 10 shows a result of measurement of Example 2.

FIG. 11 shows a result of measurement of Example 3.

FIG. 12 shows a result of measurement of Comparative Example 1.

FIG. 13 shows a result of measurement of Comparative Example 2.

FIG. 14 shows a result of measurement of Comparative Example 4.

DETAILED DESCRIPTION OF THE INVENTION

Hereinafter, a coil spring manufacturing device of an embodiment of the present application will be explained with reference to FIGS. 1 to 4.

Figure 1:
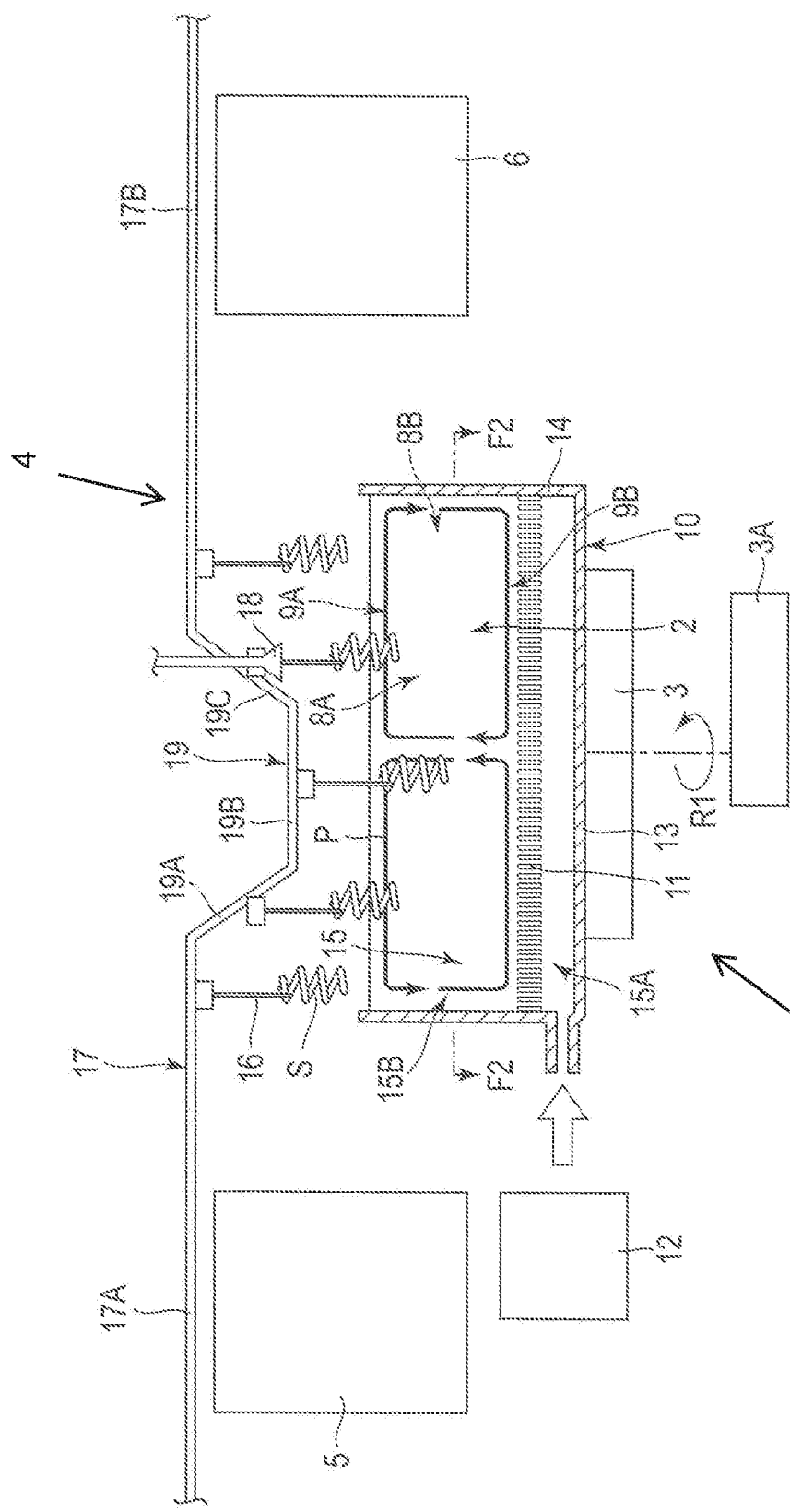
FIG. 1 is a schematic side view of a coil spring manufacturing device of an embodiment.
Figure 2:
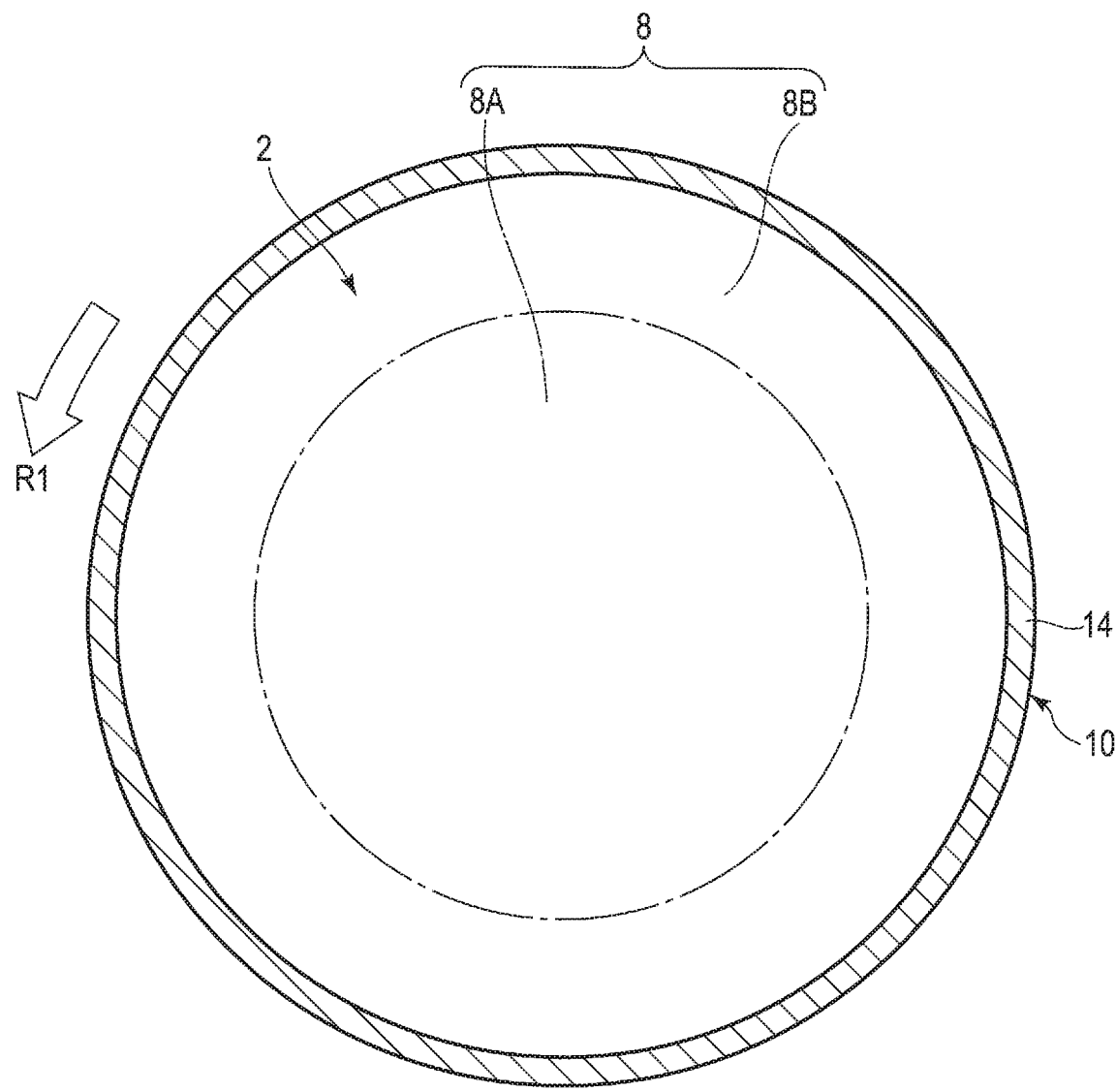
FIG. 2 is a cross-sectional view of the fluidized bed of FIG. 1.

FIG. 1 is a schematic side view of a coil spring manufacturing device 1. FIG. 2 is a cross-sectional view of a fluidized bed, taken along line F2 of FIG. 1. As shown in FIG. 1, the coil spring manufacturing device 1 includes a fluidized bed 2, relative movement mechanism 3, conveyor 4, first heating furnace 5, and second heating furnace 6.

The fluidized bed 2 includes powder coat P fluidized with a coating bath 10, gas dispersion plate 11, and circulator 12. The coating bath 10 is formed as a cylinder with a bottom and is disposed on the relative movement mechanism 3. The coating bath 10 includes a disk-shaped bottom wall 13 and a peripheral wall 14 extending upward from the rim of the bottom wall 13. The coating bath 10 includes the gas dispersion plate 11 in the internal space 15 thereof. The gas dispersion plate 11 is formed as a multi-hole plate, for example, and is opposed to the bottom wall 13 with a gap therebetween.

The internal space 15 of the coating bath 10 is divided into an upper space and a lower space by the gas dispersion plate 11. The lower space of the internal space 15 below the gas dispersion plate 11 is defined as a plenum chamber 15A. The upper space above the gas dispersion plate 11 is defined as coating booth 15B. The powder coat P is filled in the coating booth 15B.

The circulator 12 is configured to supply a fluidized gas such as air to the plenum chamber 15A. The fluidized gas supplied from the circulator 12 is filled in the plenum chamber 15A, evenly dispersed by the gas dispersion plate 11, and supplied to the coating booth 15B. The fluidized gas supplied to the coating booth 15B changes the power coat P filled in the coating booth 15B to the fluidized bed 2 from a fixed bed.

The powder coat P moves upward and downward inside the fluidized bed 2. An area in which the powder coat P moves upward or downward will be referred to as a vertical stream area 8. The vertical stream area 8 includes an upstream area 8A in which the powder coat P moves from the lower side to the upper side and a downstream area 8B in which the powder coat P moves from the upper side to the lower side.

In the present embodiment, as shown in FIGS. 1 and 2, the upstream area 8A is formed in the center part of the fluidized bed 2, and the downstream area 8B is formed in the outer peripheral part of the fluidized bed 2 close to the peripheral wall 14. In the surface side of the fluidized bed 2, the powder coat P flowing upward in the upstream area 8A moves toward the downstream area 8A. In the bottom side of the fluidized bed 2, the powder coat P flowing downward in the downstream area 8B moves toward the upstream area 8A. An area connecting the end point of the upstream area 8A and the start point of the downstream area 8B will be referred to as a surface layer area 9A, and an area connecting the end point of the downstream area 8B and the start point of the upstream area 8A will be referred to as a bottom layer area 9B.

As shown in FIG. 1, the relative movement mechanism 3 is disposed on a horizontal surface such as a floor of a factory. The relative movement mechanism 3 is formed in a disk-like shape and is connected to a rotation drive device 3A including a motor and a power transfer mechanism. The relative movement mechanism 3 is rotated by the rotation drive device 3A, and the coating bath 10 disposed on the upper surface of the relative movement mechanism 3 is horizontally rotated as shown in FIG. 2 by arrow R1. The relative movement mechanism 3 of the present embodiment may be referred to as a rotation seat 3.

The conveyor 4 includes a plurality of holders, rail 17, and air spray 18. The holder is a hanger 16, for example. The hanger 16 includes a base end supported by the rail 17 and a dropping end formed as a hook where a coil spring S is hung.

Figure 3:
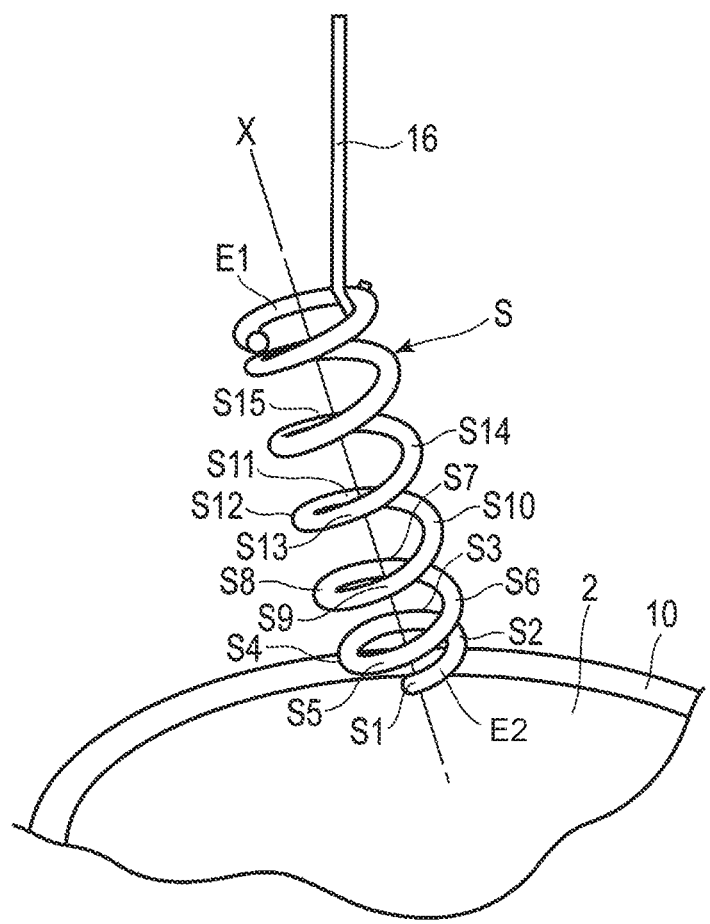
FIG. 3 is a perspective view of a powder-coated coil spring.

FIG. 3 is a perspective view of a coil spring S hung by a hanger 16. As shown in FIG. 3, the coil spring S is hung by the hanger 16 while an end coil E1 in the vehicle body side faces upward, and contacts the hanger 16 by the end coil E1 in the vehicle body side alone. That is, an end coil E2 in the wheel side does not contact the hanger 16.

The coil spring S is formed of a spring steel. The type of spring steel is not limited particularly, and for example, SAE9254 which conforms the regulation of Society of Automotive Engineers will be used. As another example of spring steel, SUP7 which conforms Japanese Industrial Standards (JIS) can be used.

The surface of steel used for the coil spring S may be formed with a chemical treatment layer. The chemical treatment layer is formed of a phosphate such as zinc phosphate. Furthermore, a shot peening treatment may be applied to the surface of the steel in order to cure the surface, to even the surface stress, and to apply a residual compressive stress for improving strength and anti-fatigue fracture.

As shown in FIG. 1, the rail 17 is arranged above the fluidized bed 2. The rail 17 includes an upstream part 17A extending from the first heating furnace 5 to the fluidized bed 2, downstream part 17B extending from the fluidized bed 2 to the second heating furnace 6, and powder bath 19 disposed between the upstream part 17A and the downstream part 17B to immerse the coil spring S hung by the hanger 16 into the fluidized bed 2.

In the present embodiment, the powder bath 19 includes a downward movement part 19A extending from the upstream part 17A to the fluidized bed 2, horizontal movement part 19B opposed to the upstream area 8A of the fluidized bed 2, and upward movement part 19C extending from the horizontal movement part 19B to the downstream part 17B. The upward movement part 19C includes the air spray 18 which sprays gas to the fluidized bed 2.

When the conveyor 4 is driven, the hanger 16 is guided to the rail 17, and the coil spring S hung by the hanger 16 passes the first heating furnace 5, fluidized bed 2, and second heating furnace 6 in this order. A relative velocity of the coil spring S conveyed by the conveyor 4 with respect to the fluidized bed 2 is less than a relative velocity of the fluidized bed 2 horizontally rotating by the relative movement mechanism 3 with respect to the coil spring S. The coil spring S hung by the hanger 16 is guided to the powder bath 19 and immersed in the upstream area 8A of the fluidized bed 2.

The first heating furnace 5 disposed upstream the fluidized bed 2 is, for example, a drying furnace used for drying rinse water when a chemical treatment layer is formed on the steel of the coil spring S. A temperature of the first heating furnace 5 is set to, preferably, a temperature greater than that is sufficient to dry water. If a chemical treatment is not applied to the coil spring S, or if there is a certain gap between the drying furnace and the fluidized bed, the first heating furnace 5 may be prepared apart from the drying furnace.

The first heating furnace 5 preheats the coil spring S to be immersed into the fluidized bed 2. The surface temperature of the coil spring S heated by the first heating furnace 5 reaches 120 to 230° C., for example, and preferably, between 150 and 180° C.

The second heating furnace 6 disposed downstream the fluidized bed 2 is a sintering furnace which heats the coil spring S immersed in the fluidized bed 2 to be adhered with powder coat P, and is disposed as a pair on the both ends of the rail 17 to fix the coil spring S hung by the hanger 16 therebetween. The heating temperature of the second heating furnace 6 is, for example, between 120 and 230° C. The heating time is, for example, 50 to 60 minutes.

Figure 4:
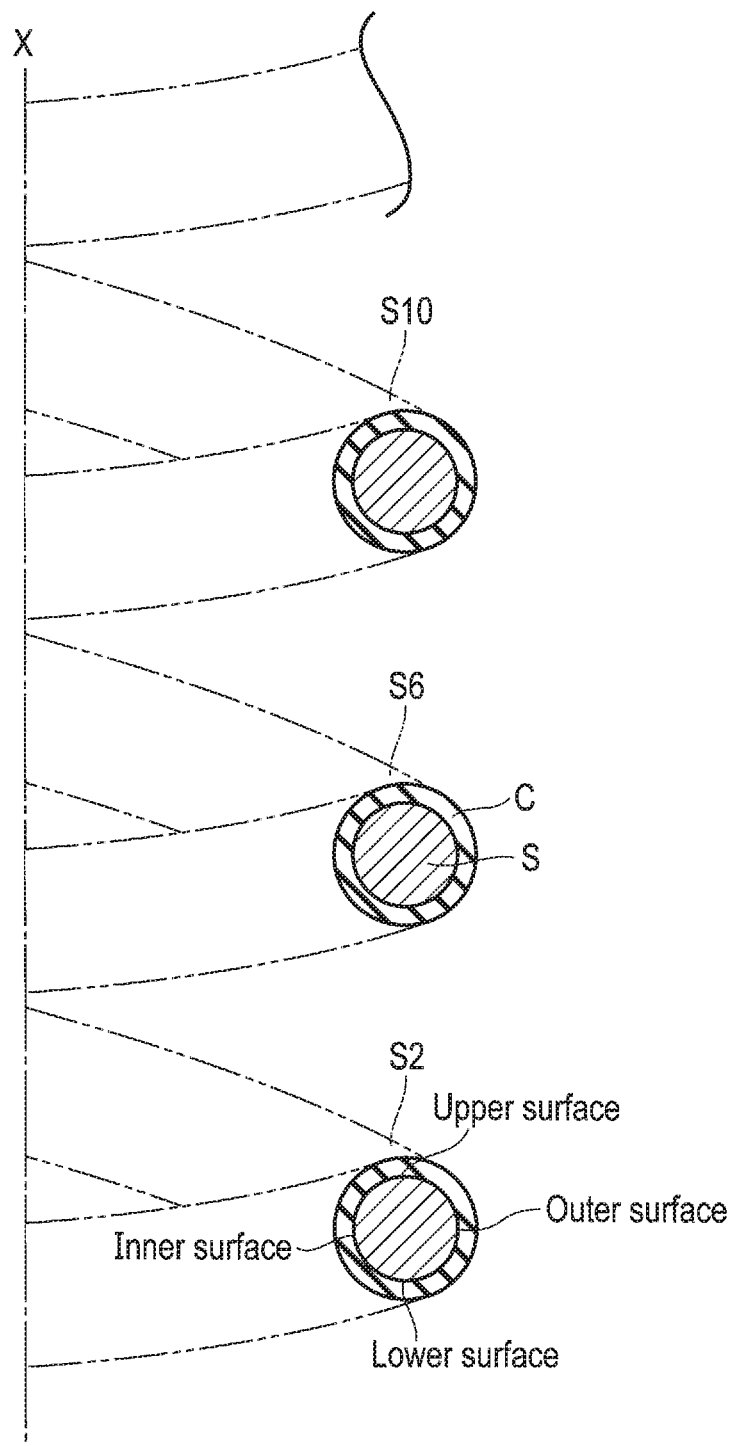
FIG. 4 is a cross-sectional view of the coil spring of FIG. 3.

FIG. 4 is a cross-sectional view of the powder-coated coil spring S. The powder-coated coil spring S includes a coating film C on the steel surface. The coating film C of the present embodiment possesses anti-chipping and anticorrosion characteristics in a single coating. The powder coat P forming the coating film C is, for example, an epoxy paint containing anticorrosion components which form a coating film to include bubbles, for example. The coating film C secures the anti-chipping characteristic by the bubbles formed inside the coating film C and secures the anticorrosion characteristic by the anticorrosion characteristic of the powder coat P.

Hereinafter, Examples 1 and 2 manufactured through a coil spring manufacturing method using the coil spring manufacturing device 1 will be compared with comparative Examples 1 to 5 manufactured through different coil spring manufacturing methods to manufacture similar coil springs S.

Example 1

Figure 5:
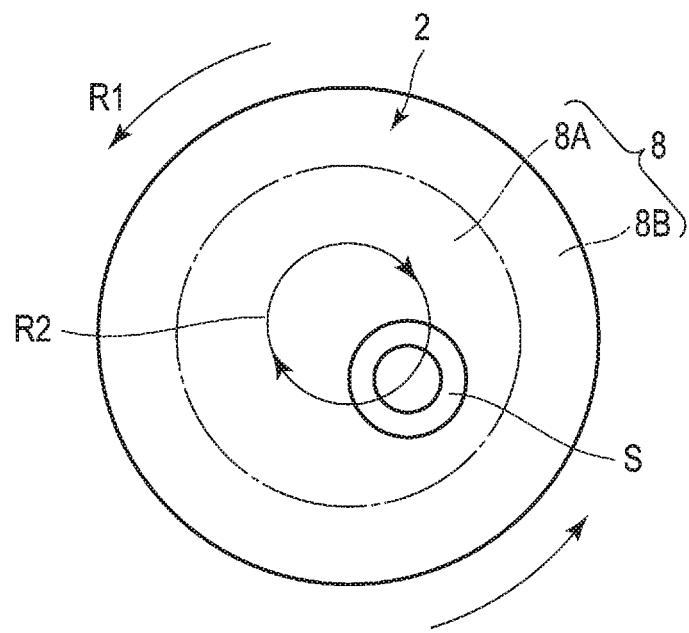
FIG. 5 is a plan view showing the movement of coil spring of each of Examples 1 and 2.

A coil spring S with a wire diameter of 9.0 mm, spring height of 285 mm, coil diameter of 91±6 mm, and number of turns of 5.8 was prepared. The end coil E1 in the vehicle body side of the coil spring S was hung onto a hanger. The coil spring S was subjected to a chemical treatment with zinc phosphate, and was heated to 120° C. in a preheating furnace. The fluidized bed 2 is horizontally rotated at 10 r/15 s, and the coil spring S was immersed in the upstream area 8A of the rotating fluidized bed 2 for 15 s. During the immersion, the coil spring S was periodically subjected to the relative movement with respect to the fluidized bed 2 as shown in FIG. 5 by arrow R2. The coil spring S was pulled up from the fluidized bed 2 and the powder coat P which was not adhered by the preheating process was blown away by the air spray 18. The powder coat P adhered to the coil spring S was sintered in the sintering furnace to form the coating film C.

Film thicknesses of the upper surface, lower surface, inner surface, and outer surface of the coil spring S were measured at fifteen positions at every 0.25 turn from the end coil E2 in the wheel side of the coil spring S (as shown in FIG. 3 with reference numbers S1 to S15). FIG. 9 shows a result of measurement.

Example 2

A coil spring S with a wire diameter of 15.4 mm, spring height of 332 mm, coil diameter of 98±5 mm, and number of turns of 6.2 was prepared in a similar manner used for Example 1. FIG. 10 shows a result of measurement.

Example 3

Figure 6:
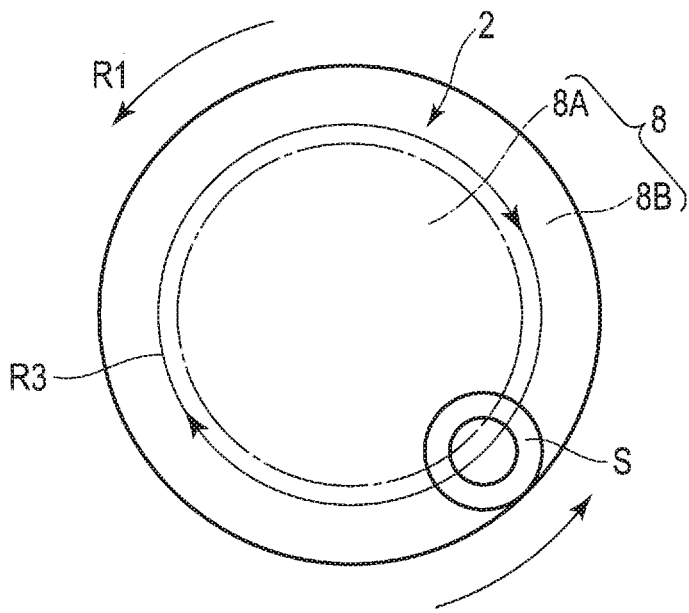
FIG. 6 is a front view showing the movement of a coil spring of Example 3.
Figure 7:
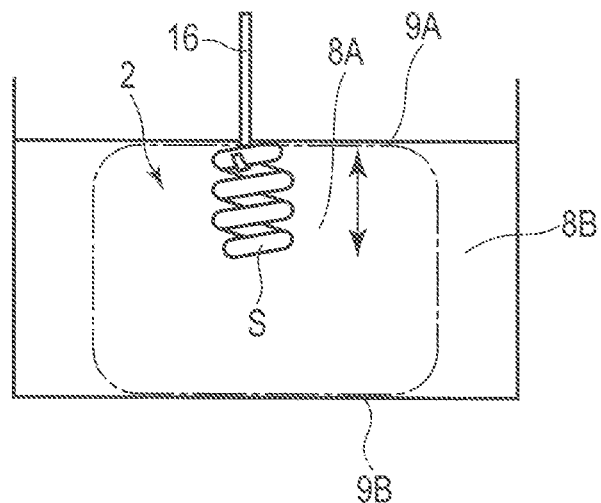
FIG. 7 is a plan view showing the movement of a coil spring of Comparative Example 4.

A coating film C was prepared in a similar manner used for Example 1 except that the coil spring S was immersed in the vertical stream area 8 including the downstream area 8B which is outside the upstream area 8A of the fluidized bed 2. During the immersion, the coil spring S was periodically subjected to the relative movement with respect to the fluidized bed 2 as shown in FIG. 6 with arrow R3. FIG. 11 shows a result of measurement.

Comparative Example 1

A coating film was prepared through an electrostatic coating method instead of the fluidized bed method using the coil spring S and the powder coat P as in Example 1. FIG. 12 shows a result of measurement.

Comparative Example 2

A coating film was prepared through an electrostatic coating method instead of the fluidized bed method using the coil spring S and the powder coat P as in Example 2. FIG. 13 shows a result of measurement.

Comparative Example 3

A coating film C was prepared in a similar manner used for Example 1 except that the fluidized bed 2 was not horizontally rotated by the relative movement mechanism 3 and the coil spring S was immersed in the still fluidized bed 2. Since orange peel occurred on the surface of the coating film C in the lower surface of the measurement points S1 to S15, the film thicknesses could not be measured.

Comparative Example 4

A coating film C was prepared in a similar manner used for Example 1 except that the coil spring S was moved vertically in the fluidized bed 2 instead horizontally moving the fluidized bed 2 by the relative movement mechanism 3. Since orange peel occurred on the surface of the coating film C in the lower surface of the measurement point S1, the film thicknesses could not be measured. FIG. 14 shows other results of measurement.

Now, results of the measurement of Examples and Comparative Examples will be explained with reference to FIGS. 9 to 14.

In Example 1 using the fluidized bed method, as shown in FIG. 9, the minimum value was 320 μm (S1 lower surface)

and the maximum value was 700 µm (S11 upper surface) whereas, in Comparative Example 1 using the electrostatic coating method, as shown in FIG. 12, the minimum value was 300 µm (S12 upper surface) and the maximum value was 850 µm (S7 outer surface).

Similarly, in Example 2 using the fluidized bed method, as shown in FIG. 10, the minimum value was 250 µm (S1 lower surface) and the maximum value was 700 µm (S4 inner surface) whereas, in Comparative Example 2 using the electrostatic coating method, as shown in FIG. 13, the minimum value was 180 µm (S13 inner surface) and the maximum value was 1500 µm (S15 outer surface).

In the electrostatic coating method, the film thickness of the outer surface is significantly different from the film thicknesses of other parts (inner surface, upper surface, and lower surface). On the other hand, in the fluidized bed method, a difference between the film thicknesses is small in the comparison between Example 1 and Comparative Example 1 and the comparison between Example 2 and Comparative Example 2.

Especially, in the comparison between Example 2 and Comparative Example 2, the difference of the fluidized bed method from the electrostatic coating method is clearly shown. In the electrostatic coating method, when the wire has a greater diameter and intervals of the turning wire is narrowed as in Comparative Example 2, adhering the powder coat onto the inner surface of the coil spring was difficult to achieve. On the other hand, in Example 2 using the fluidized bed method, such unevenness of the film thickness was not observed.

Now, Comparative Examples 3 and 4 which use the fluidized bed method but the coil spring S was not periodically subjected to the relative movement with respect to the fluidized bed 2 in a direction containing components vertical to the central axis X will be explained. In Comparative Example 3 in which the coil spring S was kept still in the fluidized bed 2, orange peel on the surface of the coating film C was severe in the lower surface of the coil spring S, and thus, the film thickness could not be measured. In Comparative Example 4 in which the coil spring S was moved vertically in the fluidized bed 2, as shown in FIG. 14, the minimum value was 300 µm (S1 inner surface) and the maximum value was 1050 µm (S11 upper surface).

Even if the coil spring S is periodically moved in the fluidized bed 2, the movement of coil spring S must include relative movement which is vertical to the central axis X, or the powder coat P moving vertically mainly collides the upper surface or the lower surface, and the film thicknesses between the upper surface, lower surface, inner surface, and outer surface become significantly different.

Now, Example 3 in which the coil spring S was periodically subjected to the relative movement with respect to the fluidized bed 2 in a direction including components vertical to the central axis X but the relative movement was performed in the vertical stream area 8 including the downstream area 8B outside the upstream area 8A as shown in FIG. 6 with arrow R3 will be explained.

In Example 3, as shown in FIG. 11, the minimum value was 290 µm (S1 lower surface) and the maximum value was 880 µm (S15 upper surface). Although a difference of film thickness is less than those of Comparative Examples 1 to 4, it is greater than those of Examples 1 and 2. In a case where the coil spring S is moved in the area outside the upstream area 8A, an even coating film was not achievable as compared to Examples 1 and 2.

With the coil spring manufacturing device 1 structured as above and through the coil spring manufacturing method using the coil spring manufacturing device 1, the coil spring S is immersed in the vertical stream area 8 of the fluidized bed 2 while the fluidized bed 2 is horizontally rotated by the relative movement mechanism 3. In other words, the coil spring S is immersed to be periodically subjected to relative movement in a direction including components vertical to the central axis X of the coil spring S in the upstream area 8A of the vertical stream area 8 as shown in FIG. 5 with arrow R1 and in FIG. 6 with arrow R3.

Through the electrostatic coating method, a large amount of powder coat P adheres to the outer surface of the coil spring S (the outer diameter part of the spiral) opposed to the electrostatic gun, and thus, the film thickness becomes uneven between the outer surface and the other parts (upper surface, lower surface, and inner surface).

On the other hand, in the present embodiment, the coil spring S is coated in the fluidized bed method, and thus, a difference of adhesion amount of powder coat P can be minimized between the outer surface and the other parts, and the unevenness in the film thickness of the coating film C can be reduced.

Note that, in the fluidized bed method, the powder coat P moves vertically inside the fluidized bed 2 in which the coil spring S is immersed, and thus, adhesion amount of powder coat P may become uneven between the vertical direction and the horizontal direction in the immersed coil spring S. For example, the powder coat P moves from the lower part to the upper part in the upstream area 8A of the fluidized bed 2, and the powder coat P collides the lower surface of the coil spring S and the adhesion amount of powder coat P to the lower surface becomes greater than those of the other parts (upper surface, inner surface, and outer surface).

However, the present embodiment includes movement R2 which is periodical relative movement of the coil spring S with respect to the fluidized bed 2 in a direction including components vertical to the central axis X to transversely cross the upstream current of the powder coat P. Thus, the powder coat P collides with respect to the coil spring S from multiple directions. Since the powder coat P adheres to the entirety of the coil spring S, and thus, unevenness of the film thickness of the coating film C can be reduced.

In the fluidized bed method, a fluidized gas ejected from the gas dispersion plate 11 gathers and generates bubbles in some cases. In the present embodiment, the coil spring S is subjected to relative movement with respect to a direction including components vertical to the central axis X to slide the bubbles adhering the lower surface of the coil spring S. As a result, an influence to the coil spring S caused by bubbles can be suppressed, and a coating film C with good exterior can be formed.

Furthermore, in the present embodiment, the powder coat P which forms the coating film C with anti-chipping and anticorrosion characteristics in a single coating is used. Since two or more kinds of powder coats are not used to form the coating film C, a top powder coat and a base powder coat do not mix even in the fluidized bed method.

Figure 8:
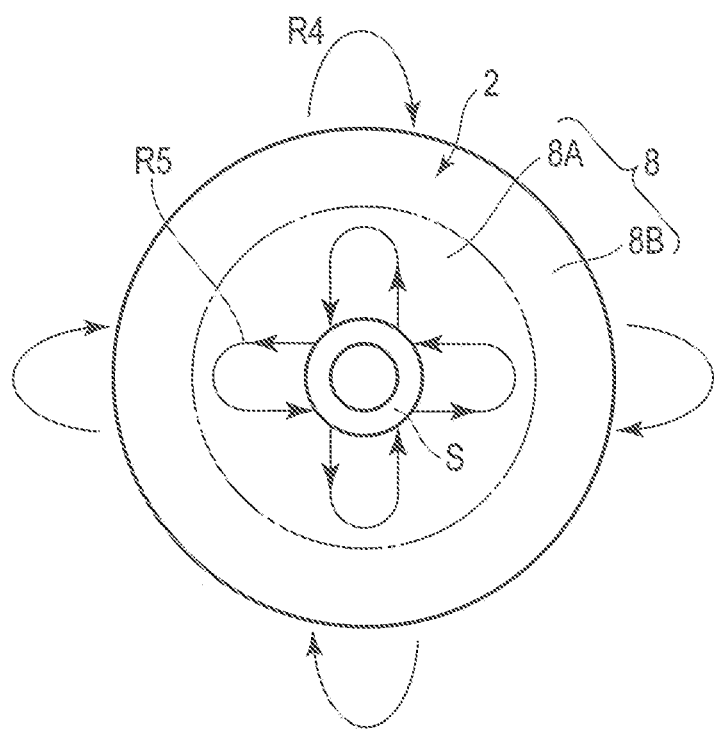
FIG. 8 is a plan view of another example of the movement of the coil spring of an example.

Above-described embodiments are examples and do not intend to limit the scope of the invention of the present application. Each of the above-described embodiments can be achieved in other models, and various omissions, replacements, and changes can be added thereto without departing the spirit of the invention. The above-described embodiments and variations thereof are encompassed in the scope of the invention and abstract thereof and are encompassed in the inventions recited in the claims and equivalents thereof. For example, when the coil spring S is periodically subjected to relative movement in the upstream area 8A of the fluidized bed 2, the relative movement mechanism 3 is driven in a cross-shape manner combining ellipse rotations as shown in FIG. 8 with arrow R4 and the coil spring S is moved in a cross-shape manner as shown with arrow R5. Although this is not shown, the coil spring may be moved in an 8-shape manner. With the cross-shape manner combining ellipse rotations or the 8-shape manner, the coil spring S can be periodically subjected to relative movement such that the powder coat P collides the coil spring S from multiple directions.

Furthermore, instead of horizontally rotating the coating bath 10, the hanger 16 may periodically meander by a relative movement mechanism. For example, a large fluidized bed 2 may be prepared, and the rail 17 of the conveyor 4 is structured to meander above the fluidized bed 2 in the powder bath 19. In that case, the conveyor 4 including the powder bath 19 is an example of the relative movement mechanism. The hanger 16 guided by the meandering power bath 19 can be periodically subjected to relative movement such that the powder coat P collides the coil spring S hung at the dropping end from multiple directions.

Or, instead of horizontally rotating the coating bath 10, the hanger 16 may be horizontally rotated by a relative movement mechanism. For example, the powder bath 19 of the conveyor 4 is structured as a horizontally rotatable stage which is independent from the rail 17. A plurality of coil springs S conveyed from the upstream part 17A of the rail 17 are switched to the powder bath 19 with the hangers 16, and the power bath 19 is moved down while horizontally rotating to immerse the coil springs S in the fluidized bed 2. After the powder bathing, the coil springs S with the powder coat P are switched to the downstream part 17B of the rail 17 with the hangers 16. In that case, the conveyor 4 including the horizontally rotatable powder bath 19 is an example of the relative movement mechanism. With such a structure, the coil spring S horizontally rotated by the powder bath 19 can be periodically subjected to relative movement such that the powder coat P collides the coil spring S from multiple directions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coil spring manufacturing method of a vehicle suspension member, the member comprising:
    a coating bath in which a powder coat is filled;
    a circulator which flows the powder coat to form a fluidized bed;
    a relative movement mechanism which supports the coating bath; and
    a conveyor which conveys a coil spring to the coating bath, the method being characterized in that
    while the coil spring is immersed in the fluidized bed in which the powder coat flows for coating,
    the fluidized bed includes a vertical stream area including an upstream area in which the powder coat flows from a lower side to an upper side and a downstream area in which the powder coat flows from the upper side to the lower side, the upstream area being formed at a center part of the fluidized bed, the downstream area being formed at an outer peripheral part of the fluidized bed,
    the powder coat flowing upstream from the upstream area moves from the center part toward the outer peripheral part of the fluidized bed, on a surface side of the fluidized bed, and the powder coat flowing downstream from the downstream area moves from the outer peripheral part toward the center part of the fluidized bed, on a bottom side of the fluidized bed, and
    the coil spring is immersed in the upstream area of the vertical stream area, which is formed at the center part of the fluidized bed, while an end coil of the coil spring faces upward, and the coil spring is periodically subjected to a relative movement with respect to a direction containing components vertical to a central axis of the coil spring so as to transversely cross the upstream area.

2. The coil spring manufacturing method of claim 1, wherein the relative movement is horizontal rotation transversely crossing the flow of the powder coat.

3. The coil spring manufacturing method of claim 1, wherein the vertical stream area is an upstream current area in which the powder coat flows upstream.

4. The coil spring manufacturing method of claim 1, wherein the powder coat is an epoxy paint containing an anticorrosion component which forms a coating film to include bubbles.

* * * * *